Sept. 19, 1961        H. P. HIGGS        3,001,106
COMPATIBLE COMPONENTS SYSTEM
Filed April 30, 1957        9 Sheets-Sheet 1
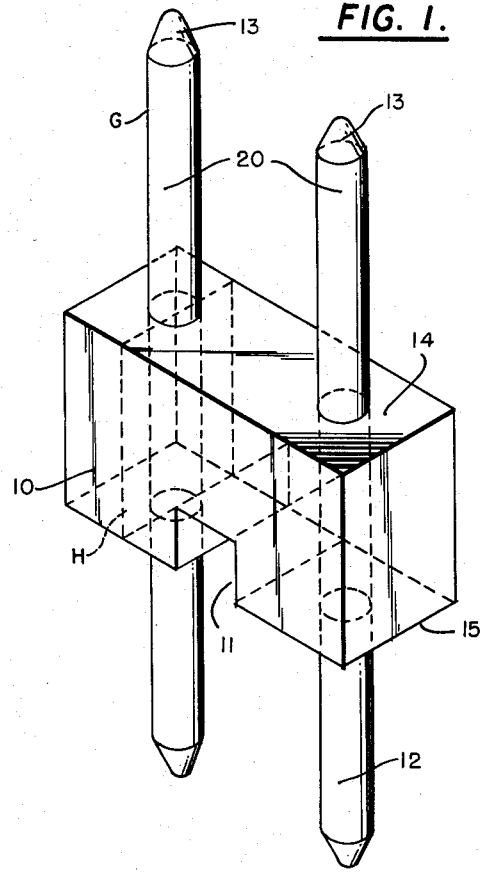
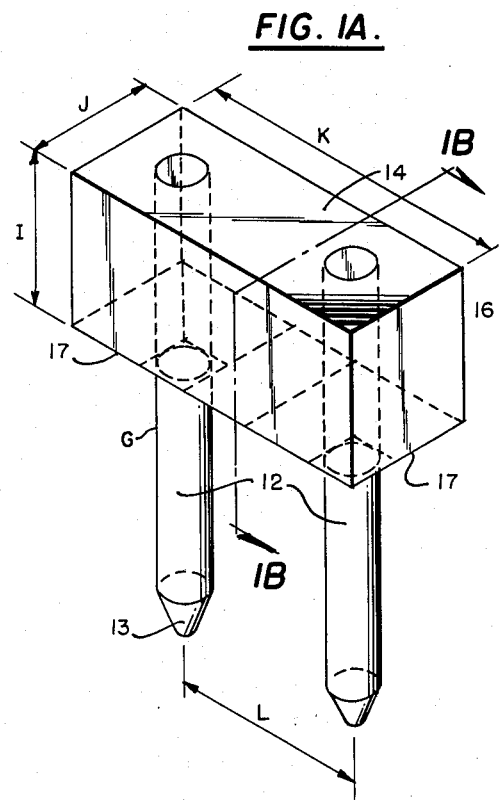
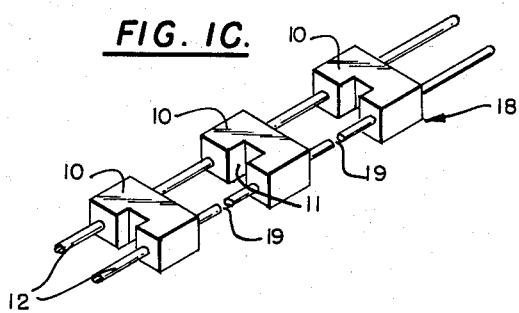
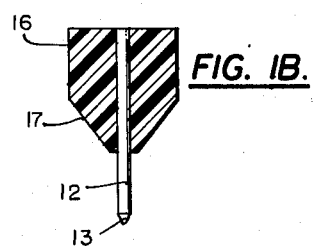
INVENTOR
Harold P. Higgs
BY
ATTORNEYS

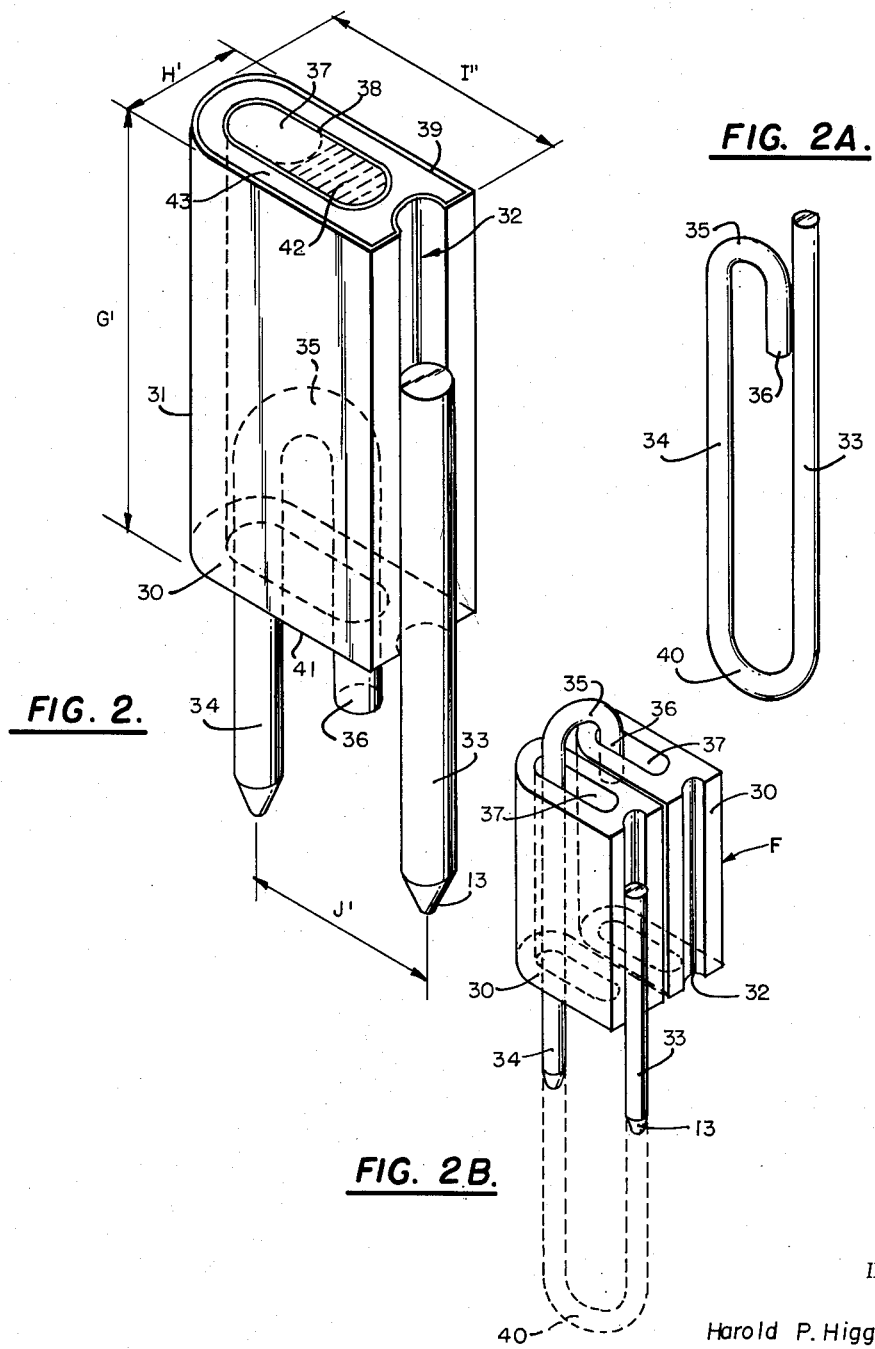

Sept. 19, 1961 H. P. HIGGS 3,001,106
COMPATIBLE COMPONENTS SYSTEM
Filed April 30, 1957 9 Sheets-Sheet 3

INVENTOR
Harold P. Higgs
BY
ATTORNEYS

Sept. 19, 1961     H. P. HIGGS     3,001,106
COMPATIBLE COMPONENTS SYSTEM
Filed April 30, 1957     9 Sheets-Sheet 4

INVENTOR
Harold P. Higgs
ATTORNEYS

Sept. 19, 1961  H. P. HIGGS  3,001,106
COMPATIBLE COMPONENTS SYSTEM
Filed April 30, 1957  9 Sheets-Sheet 6

INVENTOR
Harold P. Higgs

BY  *Moore & Hall*

ATTORNEYS

Sept. 19, 1961   H. P. HIGGS   3,001,106
COMPATIBLE COMPONENTS SYSTEM
Filed April 30, 1957   9 Sheets-Sheet 7

INVENTOR
Harold P. Higgs
BY
ATTORNEYS

Sept. 19, 1961 H. P. HIGGS 3,001,106
COMPATIBLE COMPONENTS SYSTEM
Filed April 30, 1957 9 Sheets-Sheet 8
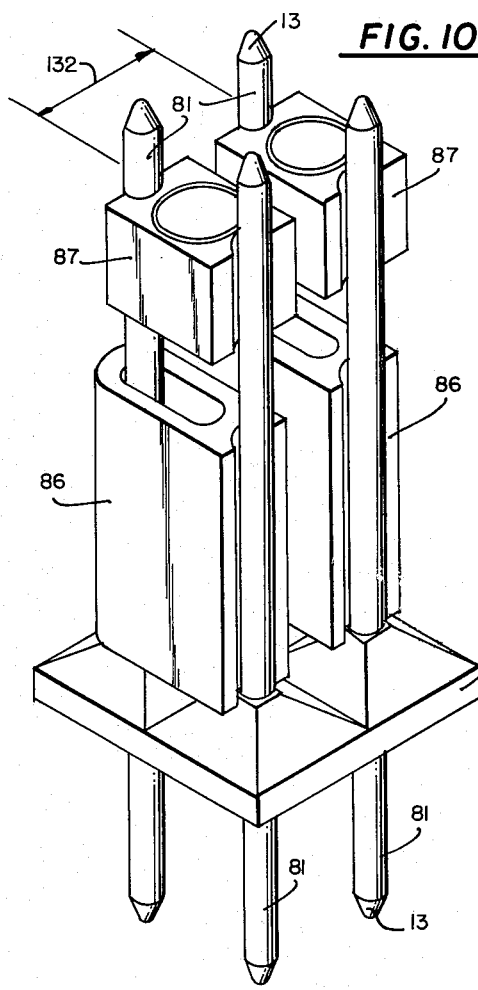
FIG. 10A.
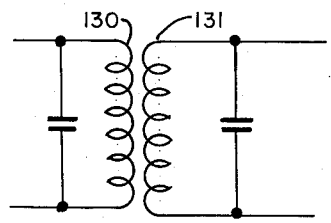
FIG. 10.
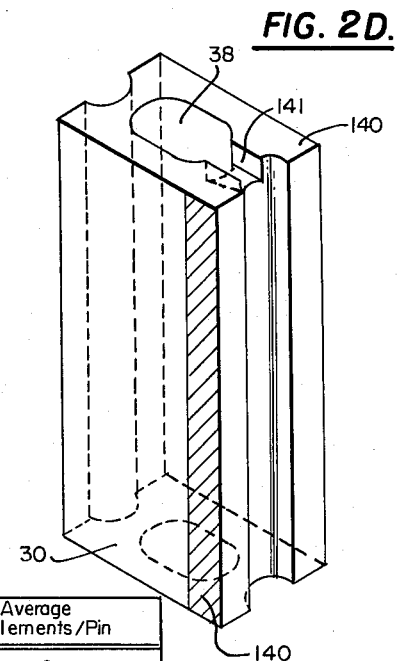
FIG. 2D.
| No. Pins | No. Elements | | Increment | Average Elements/Pin |
|---|---|---|---|---|
| 1 | o | 0 | 0 | 0 |
| 2 | | 1 | 1 | 1/2 |
| 3 | | 3 | 2 | 3/3 = 1 |
| 4 | | 5 | 2 | 5/4 = 1 1/4 |
| 5 | | 7 | 2 | 7/5 = 1 2/5 |
| 6 | | 9 | 2 | 9/6 = 1 1/2 |
| 7 | | 12 | 3 | 12/7 = 1 5/7 |
| ∞ | | — | — | 3 |
FIG. 11.
INVENTOR
Harold P. Higgs
BY *Moon & Hall*
ATTORNEYS Sept. 19, 1961 H. P. HIGGS 3,001,106
COMPATIBLE COMPONENTS SYSTEM
Filed April 30, 1957 9 Sheets-Sheet 9

INVENTOR
Harold P. Higgs
BY Moore & Hall
ATTORNEYS

United States Patent Office 3,001,106
Patented Sept. 19, 1961

3,001,106
COMPATIBLE COMPONENTS SYSTEM
Harold P. Higgs, 178 Lincoln Ave., Newark, N.J., assignor of one-fourth to Moore, Hall & Pollock, Washington, D.C., a firm
Filed Apr. 30, 1957, Ser. No. 656,083
12 Claims. (Cl. 317—101)

The present invention concerns a compatible components system comprising novel interchangeable standardized parts for printed wiring together with a flexible system of assembly by automatic machinery.

It is an object of the invention to provide a simple universal system for the manufacture of basic electronic circuit components and their interchangeable assembly into any desired circuit or subcombination by automatic machinery.

It is an object of the invention to provide novel standardized electronic circuit components which are of high accuracy and of such size as to be readily interchangeable in the system to meet the requirements of any selected circuit.

It is an object of the invention to provide novel resistors, capacitors, coils and the like of accurate value by automatic mass production machinery sized for interchangeable use in automatic assembly machines with printed wiring boards.

It is an object of the invention to provide compatible components and assembly, all by automatic machinery, in the entire electrical and electronic field comprising but not limited to, radio, radar, television, computers, controls, automation, circuits of all kinds and degrees of completeness. Tubes may be included as such or as transistors. The circuits may be at least in part magnetic.

In recent years industry has adopted the printed wiring system of supporting and electrically inter-connecting electronic parts. Production lines using a battery of machines for inserting these parts have been used. The success of these automatic assembly lines has not been all that is desired. This is due largely to the component parts not having been designed for such usage. Parts such as resistors and capacitors had been designed with flexible, long leads for point to point wiring where the points were at varying distances. To aid the automatic insertion machines, it has been necessary to package these parts in a uniform manner such as in reels and on a tape or strip. Such special measures add to the cost of the components and even then have not always been satisfactory.

For real success in the automatic manufacture of electrical devices a high degree of mechanical and electrical uniformity for the component parts is essential. The cost of these components for printed wiring should be less and not more than for the point to point type of components. This point is especially significant when it is realized that for many electronic devices, the manufacturer's cost may be 80% in parts and only 20% for all else, of which labor for assembling the parts may be only one-third or one-fourth.

In the following will be described new approaches and construction for component parts as resistors, capacitors and coils (hereinafter called elements) for use with printed wiring. The designs take full advantage of the liberties afforded and the restrictions imposed by the printed boards. For example, the precise location of the elements eliminates the need for the outer insulation. However, this precise location provided by the punched holes in the board usually imposes the need for a high degree of mechanical uniformity of the elements.

The designs are shifted from the "double ended" type to the "single ended" type much as was done years ago for vacuum tubes. This reduces the area of printed board required, thus reducing cost and size.

A grid system for hole location in printed boards has been adopted by some parts of industry. The most popular plan at present is to have holes located at the corners of a square whose dimensions are multiples of 0.1 inch. A system for assemblage of elements in a manner suitable for a wide range of circuits and which will meet the square grid plan will be described. A more efficient assembly, but one which will not work with the square grid, will also be described, both illustrative of the invention which is not limited thereto.

The elements and the assemblies are very simple. They incorporate the bare minimum number of simple parts. They are designed to be built and used by relatively simple automatic machinery. As the elements emerge from the machines they will be within very close electrical limits due to the basic design which minimizes variations. This should give a high production yield and eliminate the need for stocking elements with a wide range of tolerances as 5, 10, and 20%. For those cases where additional precision is required, provision is made for the automatic adjustment of each element.

There is a compatibility feature to this plan. By this is meant, that the basic principles and manufacturing facilities applied to the individual elements also apply to the assemblies. Since electronic devices can be expected to require both the individual elements and the assemblies, there is a great deal of production economy in this type of standardization.

In the drawings like numerals refer to like parts throughout. The several figures are present as illustrative of preferred forms of the invention, but are not to be taken as limiting.

FIGURE 1 is a perspective view of one form of resistor according to the invention, having a flat bottom.

FIGURE 1A is a perspective view of one form of resistor according to the invention, having a pyramidal or cone bottom.

FIGURE 1B is a section taken along line B—B of FIGURE 1A.

FIGURE 1C is a perspective view of a stage in the manufacture of the resistors of FIGURE 1.

FIGURE 2 is a perspective view of one form of capacitor according to the invention.

FIGURE 2A is a perspective view of a terminal detail.

FIGURE 2B is a perspective view of two condensers constructed according to the invention and connected in parallel.

FIGURE 2D is a perspective view of another modified form of capacitor.

FIGURE 10 is a schematic diagram of an intermediate frequency transformer.

FIGURE 10A is a perspective view of one from of physical embodiment of the transformer of FIGURE 10 according to the invention.

FIGURE 11 is a table of the relation of the number of pins and elements in a given assembly according to one form of the invention.

FIGURE 12B is a representative variant of the several elements of FIGURES 1 and 1A also applicable to FIGURES 2 and 3, showing three terminal combinations which may be voltage dividers, series or parallel sub-assemblies of similar or different L-C-R elements, tank circuits, transformers and the like.

*The resistor*

Figure 3:
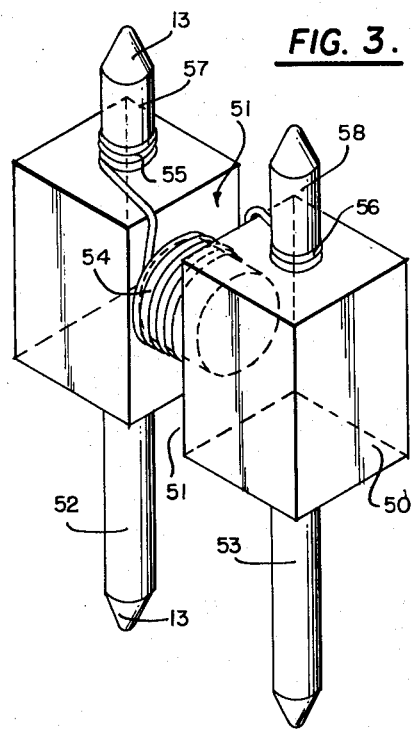
FIGURE 3 is a perspective view of one form of inductor or coil according to the invention.

In FIGURES 1 through 1C are shown two forms of resistor constructed according to the invention. The first comprises a rectangular body member 10 of molded material having a channel or air gap 11 in the bottom thereof, substantially midway between two terminal pins 12 having conical ends 13.

Unlike the conventional small carbon resistors used in electronic devices this one has both its terminals "coming out" one end, or side, instead of in a co-axial manner. This permits mounting on the printed board with less area. The terminals are preferably made round, large, soft, and pointed as at 13. Round so they can be bent in any direction on the underside of the board to hold the resistor in place. Large so as to nearly fill the hole in the board, thus assuring a good fillet of solder, between the terminal and the printed wiring. Soft so as not to place undue stress on the resistor body when the terminal is bent for securing purposes. Pointed to reduce the locating precision required as the part is inserted in the printed board hole. Air gap 11 is provided between the terminals where they pass through the board. This permits rapid evaporation of the usual rosin-alcohol flux which seeps up through the mounting holes. The top surface 14 of the resistor may be ground down to increase the resistance value. Where a higher wattage rating is desired the resistor is simply made taller. The mounting surface 15 of the resistor may be flat, pyramidal, or cone-shaped. The pyramidal-shaped bottom is shown in FIGURES 1A and 1B where body member 16 has pyramidal or cone-shaped projections 17 surrounding the terminals 12 on the bottom surface. The flat version provides better mechanical stability. The cone version requires less precision when locating the terminals in the mold, even when the ends are flat instead of pointed.

The resistor may be "end molded" or "side molded." Side molding as indicated in FIGURE 1C at 18 permits manufacture in long lengths suitable for placing on reels without adhesive tape. For test purposes, one wire is sheared or a section 19 removed. The resistance material is a conventional one employing thermo setting resin or equivalent. The molding technique may also be conventional as cold forming, compression molding, transfer molding, or casting. No insulating jacket is required since these parts are firmly secured in the board at a distance from other circuit members. A color code can be automatically applied to the top or sides. The terminals may extends above the top of the resistor as at 20 and be used effectively in conjunction with other elements, as will be described later. The terminals may be removed and the resistor ends sliced off on a plane (H) running through the axis of the terminals. The resulting resistor, with electrodes added, may be efficiently used in an assembly to be described later.

These resistors are very adaptable to placing on an adhesive tape for use with automatic machines because of the flat surfaces available for attaching the tape. They may also be readily packaged in other ways, such as a magazine.

Typical dimensions are:

I J=⅛"
L=.200"
G=.040" dia. #18 wire
K=⅚₆"

*The capacitor*

The ceramic dielectric capacitor constructed according to the invention is unlike either of the two conventional types, which are, round tubular, or flat plate (disc and rectangular) in shape. The round tubular shape is noted for its strength and uniformity of average wall thickness, but is wasteful of space due to the air space inside of the tube. The flat disc and rectangular shapes make efficient use of space but are relatively poor mechanically. The round tubular type is self-shielded, which makes it useable when located near other components and makes it insensitive to surrounding electric fields. The flat types are not shielded and can be excited by surrounding electric fields.

This new capacitor combines the advantages of the round tubular and flat types and is especially well adapted to printed wiring applications without an insulated jacket. It is also very low in cost to manufacture. Essentially, it is made by flattening a round tubular type which one might say "squeezes" the air out and leaves two flat plates connected up in a self-shielded manner.

FIGURE 2 has a flat body 30 of suitable dielectric material which may be rounded along one side as at 31. Although useable for some applications without further modifications, the drawing shows an added groove 32 to receive the terminal wire 33. The ceramic body, formed to this shape, constitutes one of the important novel features of the design. Both sides of body 30 may be rounded as at 31, both may be provided with an open groove 32 or the condensers may be constructed asymmetrically as shown in FIGURE 2. The ceramic body 30 may be formed by conventional means as dry pressing or extrusion. After proper firing it is ready for application of electrodes on the inside and outside of body 30 which has a central channel 37. This is done by complete submersion in a suitable silver paint compound, removing of excess paint, drying and then firing. To separate the inner and outer electrodes formed by coatings 38 and 39, the silver is ground off each end of the body 30. Terminals 33 and 34 are added as shown.

The inside terminal 34 is so formed as to provide a friction fit thus holding the assembly together. This kind of fit may be provided by causing the inside U shape 35 to be slightly compressed upon insertion. The outside terminal 33 may be an integral part as at 40 of the inner terminal 34 to facilitate manufacture. One end 36 of the inner terminal 34 is made to project below the bottom surface 41 of the capacitor thus providing a stop for the unit when inserted into a printed board. This allows for evaporation of alcohol flux from the board surface under the capacitor.

The terminals 33 and 34 are secured to the electrodes 38 and 39, respectively, by partial or complete dipping of the unit into a solder bath. Solder for this connection may also be provided by pre-soldering either or both of the parts. The fusion of the terminals to the electrodes is then accomplished by simply heating the unit.

The preferred non-symmetrical shape of the completed capacitor shown in FIGURE 2 is a feature when it is being positioned by automatic machinery. Packaging is also by magazine or tape. The choice of terminal design and material is the same as described for the resistor.

Color coding, tape, feeding, etc. are also the same as for the resistor.

This capacitor as is, without terminals 33 and 34, can be efficiently used in an assembly to be described later.

Variation in the nominal capacitance value may be effected in numerous ways. For standardization, it is desirable first to vary the dielectric constant and secondly to vary the unit's length. Additional variation may be obtained by changing the wall thickness and by changing the cross-section of the oval-shaped hole 37 as at 42, or by adding an unused hole.

Capacitors manufactured in a quantity production, as described above, are very uniform in capacitance value. For most dielectric materials the variation around a nominal value is less than ±3 percent. When greater precision is desired, the value of capacitance may be reduced by grinding material from the top end.

Where additional capacitance is required and is not available by the means discussed above, two or more of these basic units may be connected in parallel. The FIGURE 2B shows how two (F) may be connected in parallel by starting with only one piece of wire. The resulting assembly uses the same mounting holes as one unit.

At this point it should be noted that this capacitor element of FIGURE 2 may be positioned around the extended terminals of the resistor of FIGURE 1, thus forming a circuit with a parallel combination of resistor and capacitor. This is accomplished without extra terminals or additional printed board area.

Typical dimensions are:

$$G' = 7/16''$$
$$J' = .200''$$
$$H' = .110''$$
$$I' = .265''$$

*The inductor*

Figure 3A:
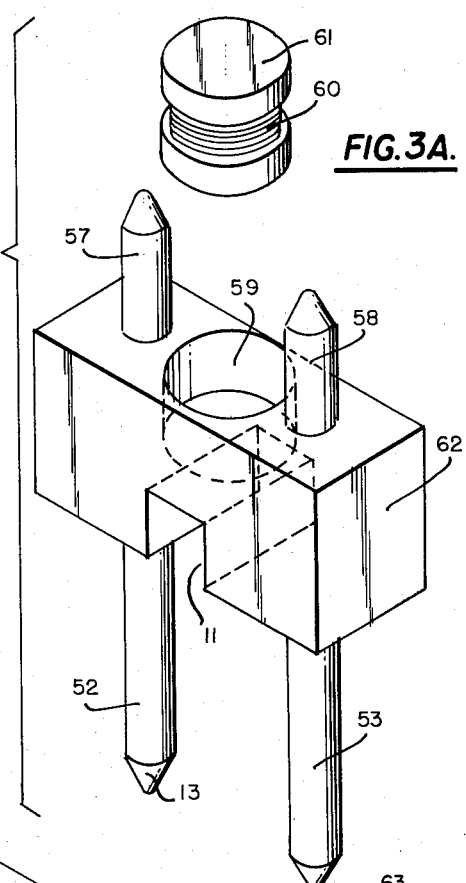
FIGURE 3A is a perspective view of a modified form of inductor.
Figure 3B:
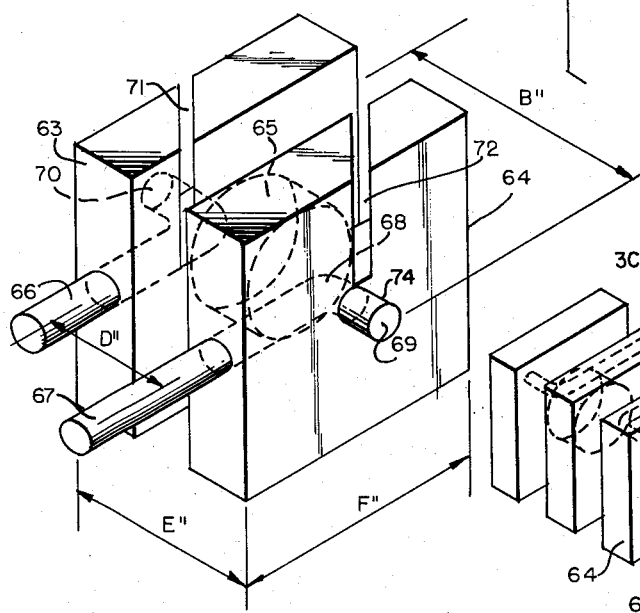
FIGURE 3B is a perspective view of a further modification of an inductor according to the invention.

FIGURES 3, 3A and 3B show a coil unit 50 according to the invention.

This arrangement is unlike any of the great variety of forms now used. It is novel in that it is double-ended, one end having terminals 52 and 53 with features as described for the resistor 10, and the same terminals extending out the other end at 57 and 58 where the coil wires are connected.

The rectangular shape is very similar to the resistor 10. However, a groove 51 is provided in the form between the terminals 52 and 53. In this groove 51, turns of wire 54 are placed side by side, or in layers, and the ends 55, 56 connected to the terminals to form a coil. The form or body 50 may be an insulating material, as molded phenolic resins, or may be of powdered iron, ferrite, or related materials.

In FIGURE 3 another arrangement provides a well 59 in the body 62 between the terminals 52, 53 into which may be placed a coil 60 which has previously been wound on a small bobbin 61. A bobbin 61, as shown, made from ferrite with a diameter of ⅛ inch has been wound with #46 wire to provide an inductance of 1.5 millihenries, a distributed capacity of 1 micromicrofarad and a Q of 100 at 455 kc. Any lesser value of inductance is of course readily obtained.

Here, too, like the resistor 10, the terminals 52, 53 may be removed and the ends 57, 58 cut off and the resulting unit used in an assembly to be described. Also note that this modified unit may be positioned over the extended ends of the resistor. Note too, that the capacitor terminals 33, 34 may extend above the body 30 and thus receive the coil.

These coil forms may be made in chain fashion like the resistors. The chain may be single or dual. With this coil form it is a bit difficult to wrap the ends around the terminals because the wrapping motion is in a plane at right angles to the plane used when winding the coil. The other terminal gets in the way.

Figure 3C:
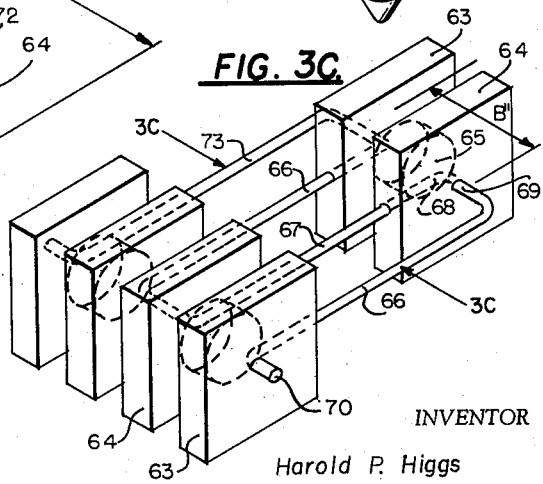
FIGURE 3C is a perspective view of a manufacturing step in the production of inductors according to the invention.

This problem may be overcome and other advantages obtained when the coil forms are made in a sort of dual chain fashion shown in FIGURE 3C. The double row of molded forms is separated into single rows by cutting along line 3C.

As shown in FIGURE 3B the coil or inductor component comprises two rectangular body members 63 and 64, joined together by a central cylindrical member 65 around which a coil similar to 54 is wound. Body members 63 and 64, which may also be round or other shape, are provided with terminals 66 and 67 molded therein and each bent outwardly as at 68 to provide projecting lugs 69 and 70 for connecting the ends of the coil wrapped around cylindrical member 65. Members 63 and 64 are angularly slotted as at 71 and 72 for passage of the coil ends and to facilitate their connection to lugs 69 and 70. It is within the spirit of the invention to eliminate the lugs 69, 70, to cause the terminals 66 and 67 to penetrate the slots 71 and 72 where the coil ends may over-lie the terminals 66 and 67 and can easily be permanently connected by solder or the contact maintained by a suitable plastic filler material, metallic paint, conductive metallic adhesive or a wedge.

After cutting along the line 3C of FIGURE 3C, the single row is now fed into a machine provided with a headstock similar to the ones used on automatic screw machine lathes. The sections are now caused to emerge, one at a time, from the head stock, are wound, and then pass into a hollow tail stock. In this way coils are wound with one continuous piece of wire. The terminal wrapping, which consists of a few turns wound around the wire 74 between the coils, is in the same plane as the coil winding. Furthermore, one wrapping of wire serves for the start of one coil and the finish of the other. In like fashion, only one solder joint at 74 is required per coil because the inter-connecting terminal extending between adjacent slots 72 is cut as by shearing in the center after soldering, forming lugs 69 and 70. It will be seen that the connecting portion 73 is found only on the end inductors and that the separating of inductors is done by shearing the portion 74.

In the large view of FIGURE 3B slots have been added. These are to accommodate and protect the start and finish ends.

Typical dimensions are:

$$B''=.400$$
$$D''=.200$$
$$E''=.300$$
$$F''=.400$$

*The assembly*

Having shown how the basic circuit elements of inductance, capacitance and resistance (LCR) are made in a simple low cost manner as individual pieces, it will now be shown how the basic manufacturing facilities, with little or no change, can produce a grouping or assembly of these elements. Such an assembly improves efficiency by reducing the average number of terminals or pins required to support an element. The single elements require two terminals each. In a typical circuit assembly, only about one terminal per element is required. In some circuits, even less than an average of one terminal is needed. This high efficiency is achieved by multiple use of a given terminal and stacking or paralleling of elements.

In most cases the required electrical circuit connections between the elements are made without the use of separate wires, printed wiring or other separate pieces. This aids in keeping the manufacturing cost low and aids in making quicker deliveries.

With this efficient grouping of elements, a large number per square inch is possible thus reducing the area and cost of the printed wiring board to which it is attached. The cost of assembly labor is also reduced.

Figure 4:
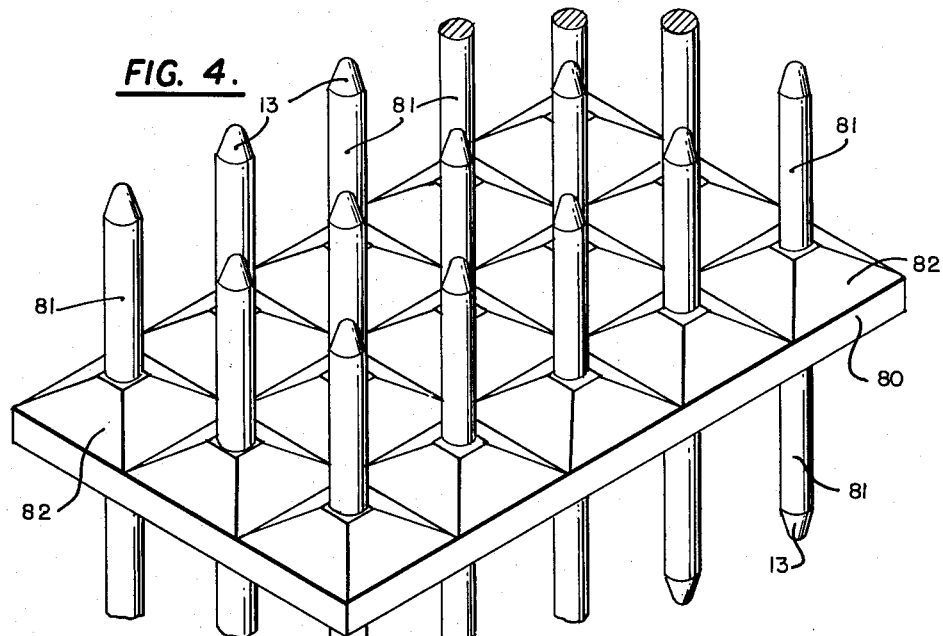
FIGURE 4 is a perspective view of one form of assembly mounting according to the invention, by which the several components are assembled to form circuit sub-assemblies, circuit component groups, or entire circuits, depending upon the purpose intended.
Figure 5:
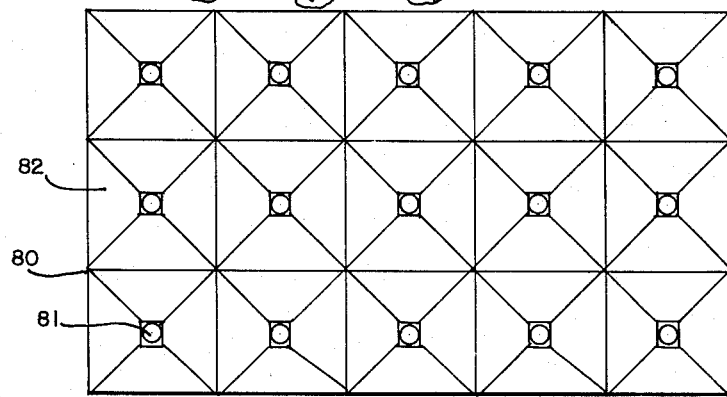
FIGURE 5 is a plan view of the structure of FIGURE 4.
Figure 6:
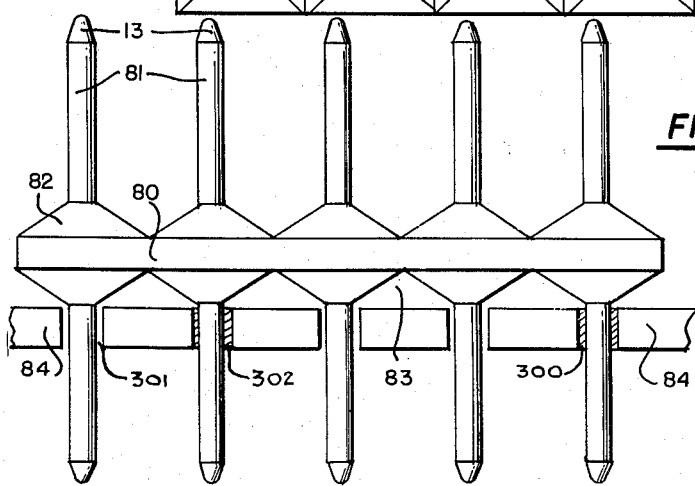
FIGURE 6 is a front elevation of the assembly mounting of FIGURE 4 with a printed wiring or a printed circuit board associated therewith.

In FIGURES 4, 5 and 6 is shown an assembly base 80 having pins 81 centered in pyramid or cone mountings 82 surrounding each pin and integral with the base 80.

The elements are assembled by machine to base 80 in which is located the pins or terminals 81. The pins are preferably secured to the base by molding. They are pointed on each end 13. This makes their positioning in the mold non-critical, it also permits more freedom in positioning of elements around the pins.

Additionally, having points on each end removes polarity of the pins so they may be fed into the mold either end first. The pins 81 may be located at the corners of a square thus complying with a grid system. A typical spacing is .2 inch. A number of pins per row may be provided and a number of rows may be used. The use of two or more rows provides for greater mechanical stability than one row.

The top and bottom of the base 80, as stated above, are made pyramid or cone-shaped surrounding each pin. This permits loading the pins into the mold and closing the mold without alignment difficulties even when the pins are not pointed. It also provides the required air space 83 between pins to permit rapid evaporation of flux lodged there on the printed board 84. On the top side, it keeps the lower surfaces of the elements open to the air, thus permitting application of a protective coating. Board 84 is grid perforated on top or side to receive pins 81 and printed on its reverse or bottom side in FIGURE 6 with suitable connecting wiring to produce the desired circuit or subcombination. In this way the mere insertion of pins 81, which are properly spaced by base 80, into the perforations of board 84 automatically connects selected pins 81 by means of the printed conducting lines on the bottom or top of board 84. The various elements are normally placed on the upwardly projecting portions of the pins 81, but of course may be applied to the bottom ends as well. Although the printed wiring itself may contain circuit elements as well as providing connections and/or terminals it is expected that accuracy and performance will usually require that elements of the preceding figures be used. The whole assembly as well as the manufacture of the individual elements is intended to be carried out substantially entirely by automatic machinery. The base 80 may be made of resistor material. After molding, the base can be cut or broken into pieces 1 x 2 to provide a method of producing resistors. A voltage divider can be formed by cutting the base into strips 1 x 3, 1 x 4, 1 x 5, etc.

Figure 7A:
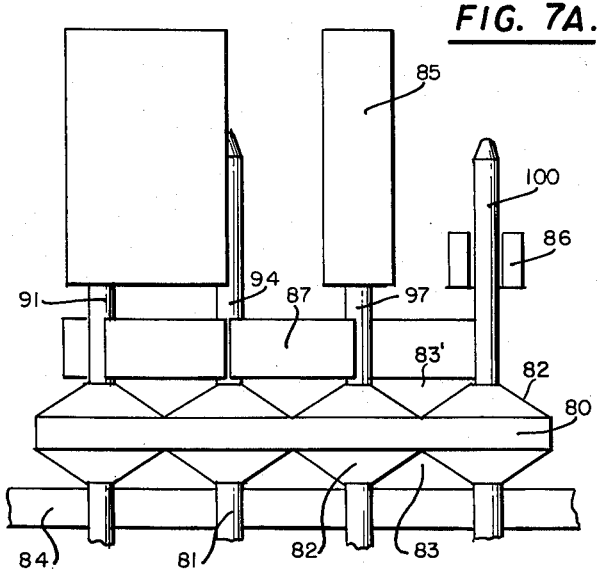
FIGURE 7A is a front elevation of one form of actual circuit assembly, comprising a physical embodiment of the circuit of FIGURE 7, according to the invention.
Figure 7:
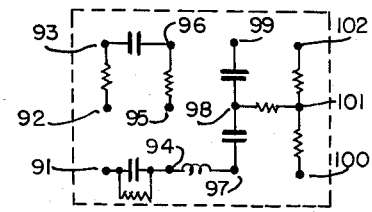
FIGURE 7 is a schematic drawing of a simple circuit or circuit sub-assembly.
Figure 7B:
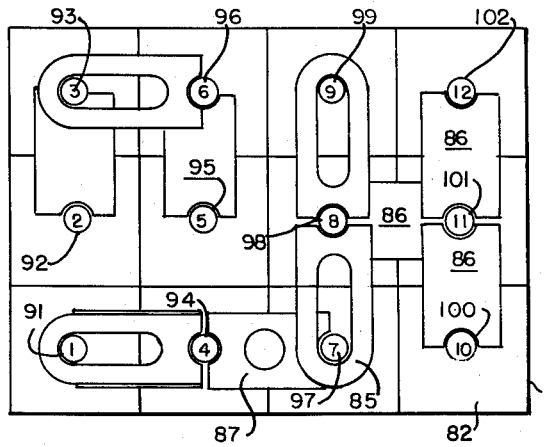
FIGURE 7B is a plan view of the assembly of FIGURE 7A.
Figure 7C:
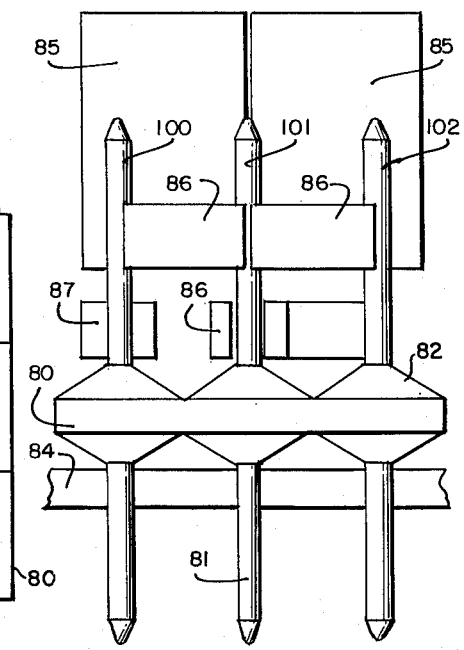
FIGURE 7C is a side elevation of the assembly of FIGURE 7A.

FIGURE 7 shows a simple circuit subcombination which may be constructed automatically according to the invention. FIGURES 7A, 7B and 7C show the board 84, base 80 and pins 81 with the assembled capacitor and resistor elements corresponding to circuit schematic of FIGURE 7. Desired additional connections usually not involving actual elements are made by the printed wiring on the bottom or top of board 84 which may also supply any desired terminals, or selected pins 81 can be used for such purpose.

Note that the capacitor element 85 is identical to one previously described. The resistor 86 and coil 87 elements are the same as previously described except that the ends are removed on a plane running through the terminal. The exposed half round surface is metalized by any conventional method and then solder plated. The pins 81 are also solder plated prior to assembly. To complete the fusion of the solder plated members the assembly is heated until the solder melts. In this illustration we have eleven elements supported by twelve pins.

The individual pins 91—102 of FIGURES 7A, 7B and 7C correspond to the similarly numbered junctions in the schematic circuit of FIGURE 7. It will be realized that although FIGURE 7 is intended merely as a simplified showing, it may well form part of a larger circuit to which the apparently isolated parts are connected.

Figure 8:
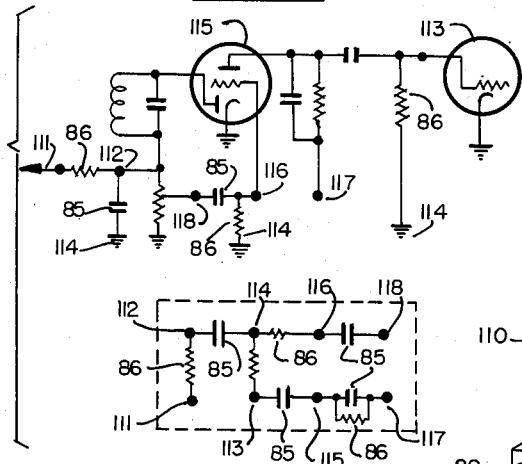
FIGURE 8 is a schematic diagram of another sub-circuit assembly representing a portion of a typical small radio receiver circuit.
Figure 8A:
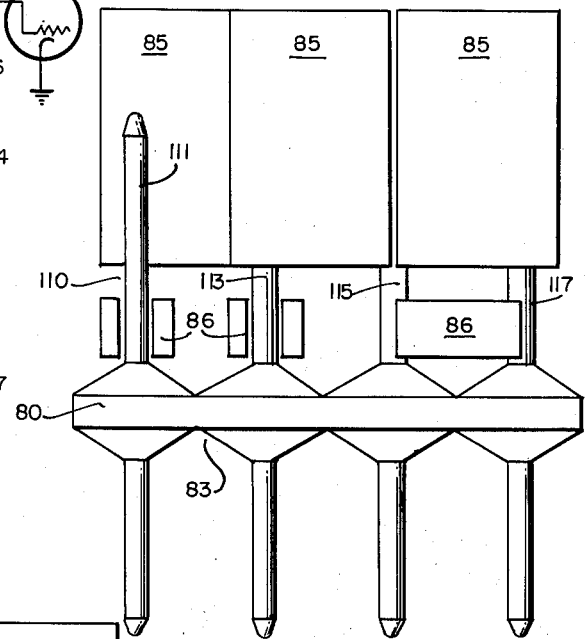
FIGURE 8A is an elevation of one form of embodiment of a part of the circuit of FIGURE 8 in physical equipment according to the invention.
Figure 8B:
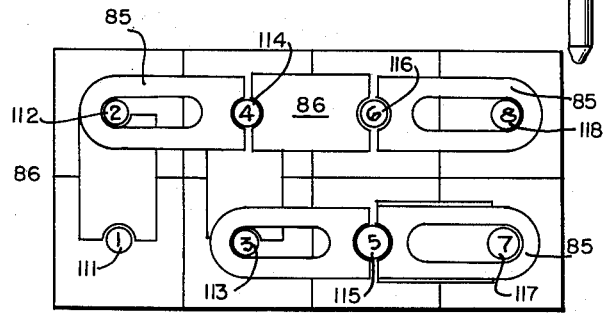
FIGURE 8B is a plan view of FIGURE 8A.

FIGURES 8, 8A and 8B illustrate a specific application of the assembly in somewhat incomplete form.

Figure 8C:
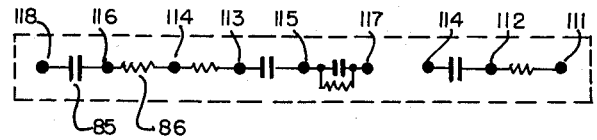
FIGURE 8C is an alternate schematic layout of the elements of FIGURES 8A and 8B.
Figure 9:
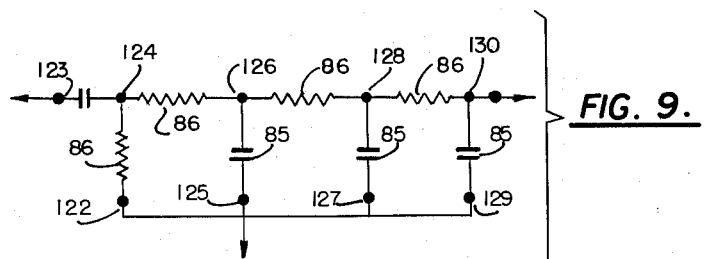
FIGURE 9 is a schemaic diagram of another sub-circuit assembly representing a portion of a vertical integrator circuit of a television receiver.
Figure 9C:
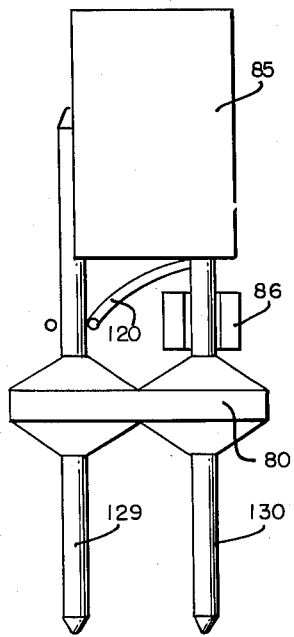
FIGURE 9C is an end elevation of FIGURE 9A.
Figure 9A:
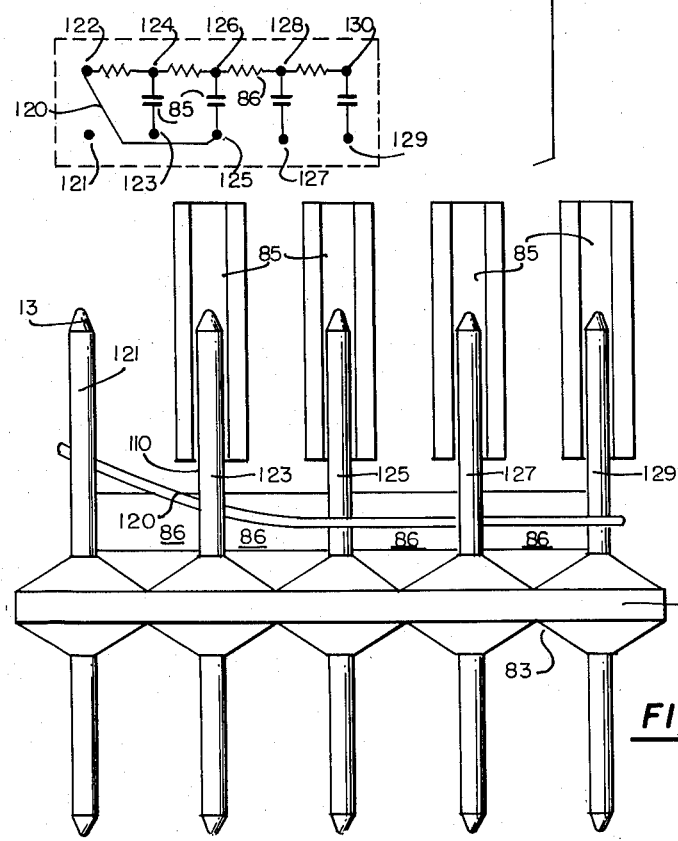
FIGURE 9A is a front elevation of one form of physical embodiment of this circuit of FIGURE 9.
Figure 9B:
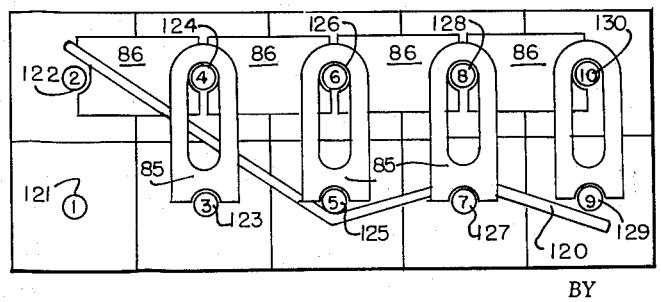
FIGURE 9B is a plan view of FIGURE 9A.

Shown is a portion of a typical small radio receiver circuit. The elements are assembled on a "2 x 4" base. The resistors 86 are placed next to the base, then an air gap 110, then the capacitors 85 on top. This sequence is preferred, since when the resistor and capacitor locations are interchanged, longer pins are required. All the desired inter-connection of elements is achieved without internal wiring or printed circuits. Eight elements are supported by only eight pins. An alternate arrangement (1 x 9) schematic is shown in FIGURE 8C. Note that an additional pin 114 has been added for ground. Pins 111—118 are connected by resistors 86 and condensers 85. Other elements of FIGURE 8 may be included in FIGURES 8A, 8B and 8C as desired.

FIGURES 9, 9A, 9B and 9C illustrate another specific case, the vertical integrator circuit of a television receiver. A 2 x 5 base is used. A wire 120 is shown making an internal connection between pins 2, 5, 7 and 9. This connection can be made externally at lower cost by using the printed board 84.

It is now evident that most any circuit can be readily assembled with these elements. Furthermore, the assembly can be made to "stretch out" the circuit or to "bunch" it, depending on the number of rows used and the dictates of the electronic devices.

The compatibility, flexibility and simplicity of the system is further illustrated by an assembly of elements to form an intermediate frequency transformer, as shown in FIGURES 10 and 10A. In this case each of the circuits 130—131 is fixed tuned to the desired frequency. Coupling between the coils 87 is controlled by bending the pins as at 132 thus changing the distance between them. Once established, this coupling may be maintained by a member joining the coils or pins.

Where it is desirable to associate a vacuum tube with this assembly it may be mounted on a plate and secured to the pins on either end or the sides of the assembly.

Where desired, the assembly may be given protection against the elements and physical damage. This may be done by dipping in a suitable coating material or adding a metal shield can or both. Complete potting in a mold with a suitable casting resin, or potting in a can, offers excellent all around protection, the need for which is most likely to arise in military or certain industrial applications (such as computers).

These assemblies may be very easily serviced when plugged into a socket in the manner of a vacuum tube. The plug-in feature is also an aid during development of a circuit. To obtain plug-in service, a separate socket, or special holes in the printed board are not required. The pins 81 may be made the same diameter as those used for vacuum tubes (.040 dia. for miniature types). The tube socket clips are placed on the pins of the assembly and then the clips passed through the printed board and soldered in place. The assembly may now be removed, leaving the clips in perfect location for re-entry. This is another example of compatibility with existing manufacturing facilities.

In the square grid assembly just described the resistor and coil are located between the pins 81 in such a way as to be quite secure. The capacitor on the other hand is not entirely between the pins and while being soldered must be held in proper position because it is loose on the pin 81 which goes through the hole. This looseness may be eliminated by reducing the hole size, but it is usually preferred for this and related assemblies to modify the capacitor so that it will be held in place between the pins in the same manner as the resistor 86 and the coil 87.

The modification of the capacitor is shown FIGURE 2D. As each of the electrodes must be made available from the outside, acceptable means must be provided for the inner electrode. The capacitor body 30 is completely silvered inside and out as before, but now in addition to grinding both ends, silver is also removed from two like areas, one on each side as indicated at 140. A notch 141 in the ceramic body 30 remains silvered and serves to bring the inner electrode 38 to the outside. This type of capacitor may be used in the square grid systems of FIGURES 4–10, inclusive, as well as in the delta assembly system described below.

*Delta assembly system*

The objective in this system is to support as many elements as possible with the fewest pins. In doing this we will not resort to parallel connection of elements nor will we mechanically stack them in layers as was done in the previous system. In other words, all elements are only one layer deep, which reduces the height of the assembly.

FIGURE 11 shows how a given number of pins 81 must be arranged in one plane to support the maximum number of elements. Note that every time an equilateral triangle is formed two additional elements are supported, except when the sixth triangle is formed we have a hexagon and the added number of elements supported is three.

Note that the center pin holds the ends of six elements or the equivalent of three whole elements. From this it may be seen that as the number of pins increases and the ratio of center pins to total pins increases, the number of elements per pin approaches three as a limit.

Figure 12:
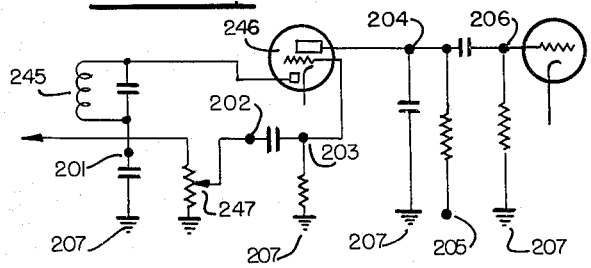
FIGURE 12 is a circuit diagram to be at least partially embodied in physical structure.
Figure 12B:
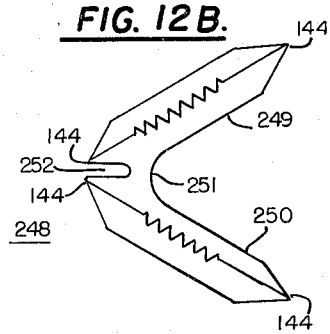
Figure 12A:
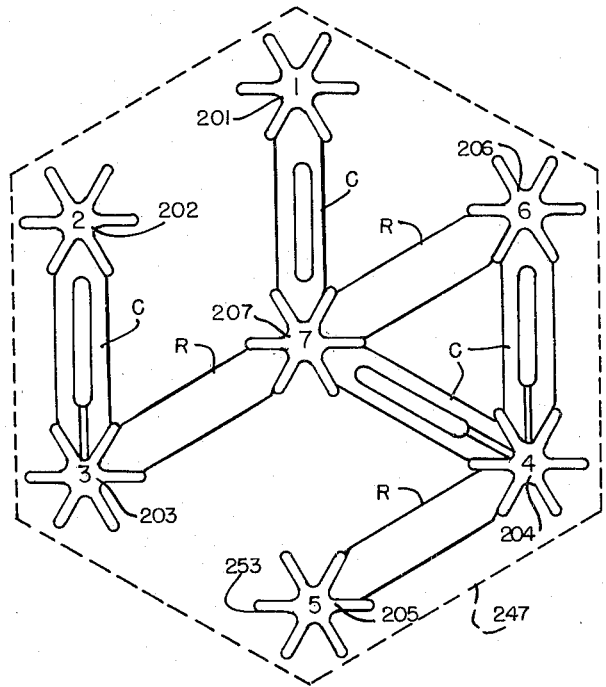
FIGURE 12A is one form of embodiment of at least part of the circuit of FIGURE 12 in physical equipment according to the invention.
Figure 3D:
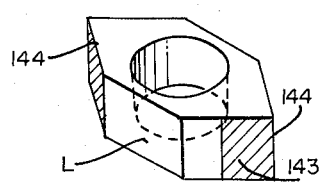
FIGURE 3D is a perspective view of one form of compatible inductive component according to the invention.

FIGURE 12 is a schematic diagram of a simple radio receiver containing junctions 201 through 207 which are represented by corresponding pins bearing respective numbers in the delta assembly of FIGURE 12A. The pins 201–207 have a gear shape cross-section having six star-like prongs or teeth positioned as sixty degree angles radiating from the pin axis to receive the ends of the R.C.L. elements.

Figure 1D:
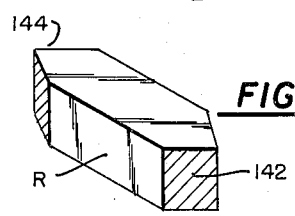
FIGURE 1D is a perspective view of a further modified form of resistor according to the invention.
Figure 2C:
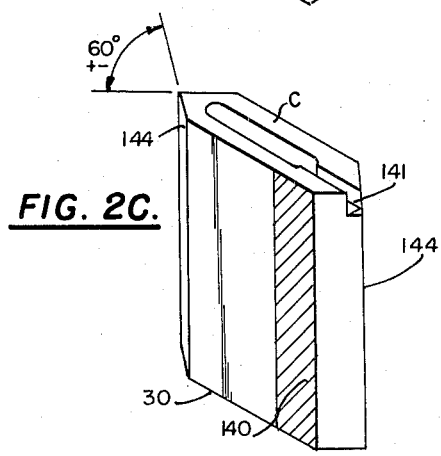
FIGURE 2C is a perspective view of another form of capacitor.

FIGURES 1D, 2C and 3 D give the principal elements of the system, representing respectively a resistance R, capacitance C, and inductance L. The ends of the elements are formed to an angle 144 about sixty degrees, so they will fit between the teeth of the gear-shaped pins which may be made of gear rod or pinion wire. The shaded areas 142 and 143 on the ends of resistor R and inductance or coil L, respectively, represent metal-izing for soldering them in place. The shaded area 140 on capacitor C on the other hand represents removal of that portion of the silver electrode and in this respect as well as by the provision of a notch 141 capacitor C resembles the construction of FIGURE 2D.

In FIGURE 12A selected elements R and C of a radio receiver are arranged in a delta system. While no inductors are shown, tank 245 could be included by placing L and C elements in parallel with one pair of ends in the teeth of pin 201 and the opposite ends in an additional pin not shown, which would be provided for connection to the triode 246. In FIGURE 12A seven elements, all in one layer, are supported by seven pins 201–207 mounted in a base 247 through which they may project for insertion in a delta grid perforated and wire printed board similar to 84 in FIGURE 7A.

Tank circuits 245, voltage dividers and bridge elements similar to 247 may also be made up as well as any desired combination of R, C and L. These may take the form of double ended elements similar to those shown in FIGURE 1D, 2C and 3B, but contain plural elements such as L and C in series or in parallel. A three-ended variant of this construction is shown at 248 in FIGURE 12B which has two legs 249 and 250 joined at 251 and provided with a slot 252 to receive a tooth such as 253 of a pin. The legs 249 and 250 diverge at approximately sixty degrees and may contain R, L and/or C elements in any desired combination. The center tap could be carried out to one of the leg extremities or whatever other connection the circuit may require.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

Reference is made to my copending U.S. Patent No. 2,918,640 granted December 22, 1959 on an application filed March 23, 1956, for Transformer Construction. See base member 2 of the patent for construction background details in relation to base member 80 with pins 81 mounted therein.

Although the base member 80 is shown as a plane, it will be understood that it may be stepped, trihedral, etc. or curved in any suitable manner. It may be ellipsoidal, cylindrical, spherical, reversely curved, saddle shape, etc. Again, the coordinates according to which the pins 81 are positioned may be cartesian, rectangular, oblique, spherical, cylindrical, ellipsoidal, curvilinear, logarithmic, or follow any selected law of arrangement. They may also be unsymmetrical. It follows that for some applications all of the several circuit elements R, C, and L will not be of the same length. In the usual application, however, they will be entirely interchangeable.

Further construction within the spirit of the invention would comprise molding a single row of terminals such as shown in FIGURE 6, using a resistor compound in place of a thermal setting insulating high resistance material. This would produce an elongate resistor with resistances between the pins which could be used as a voltage divider, the end pins serving as terminals and the intermediate pin or pins providing taps. For production reasons, all of the resistor elements between the several pins would probably have the same value, but this need not necessarily be so. For example, it would be a relatively simple matter to bridge selected adjacent pins by means of parallel resistors, giving an effective difference in drop between the two pins. This principle could be applied to the FIGURE 9 assembly. All of the resistors shown would be an integral part of the base. The uneven numbered terminals in FIGURE 9 would require to be insulated from the resistor terminal which would require special provision in manufacture, as by use of fiber sleeves, insulating paint, or similar techniques 300. Resistors produced by this construction and method are believed to have considerable practical value, as they can be sturdy, of very cheap construction, and in many cases, molded integrally with the much higher resistance material comprising the insulating base.

Sleeves 300 can position the pin assembly 80, 81 so that most of the pins 81 are clear of the base board 84 as shown at 301. Where desired, conducting sleeves or paint 302 may be employed to assure contact with the resistor base or a printed wire. Where circuits are imprinted on a resistor base, the base may have an insulating coating of paint or lamination to receive the printed circuits. Again, it is sometimes desirable to sandwich the printed circuit between two such insulating laminations to protect it and assure performance. These constructions are of course not confined to resistor bases, but are of more general application and will function quite as well where base 84 is insulating.

Reference has been made in the body of the specification to printed circuits and printed wiring. These techniques are well known in the art and may be utilized as part of the present inventive combination. It will be understood that wiring diagrams or even circuit elements can be printed upon either the base 80 or the board 84. This is preferably done on board 84 by the use of metallic paint which may have as its principal conducting element, any of the well known metals, together with a suitable binder which may, itself, be conductive. The circuits or wiring diagrams are preferably printed on the separate board 84 and may either be on the same side or the opposite side from the element 80 or the several circuit component elements. Where the printed circuit or wiring diagrams are placed on the bottom, as in FIGURE 7 for example, they will avoid any danger of being shorted or abraded by other assembly operations, such as soldering and the like. In printing such circuits, it may be desirable to provide metallic ferrules for insertion in the perforations of the board 84 into which the pins 81 project and make good electrical contact. Again, it would be sufficient to paint the inner walls of the perforations of the board 84, or to paint rings around the perforations of such thickness that contact with the pins is definitely assured and at the same time affording an effective terminal for the several printed wires. While printed circuits per se are regarded as old, their method of application to the present structure as discussed above, is regarded as part of the present invention and to come under the claims appended hereto.

I claim:

1. In combination a compatible components electronic system of interchangeable standardized basic electronic circuit components constructed for assembly by programmed automatic machinery into at least a portion of a selected electronic circuit being mass produced, comprising a base member, mounting elements of electrically conductive material constructed as part of said base member for electrical connection upon contact with circuit completing terminal elements of any of a group of compatible circuit components consisting of resistance, inductance, capacitance, impedance and combinations thereof; said mounting elements being positioned on said base member in accordance with a selected set of coordinates and spaced to cooperate with the circuit completing terminal elements of members of said group, compatible circuit components of a group consisting of resistance, inductance, capacitance, impedance and combinations thereof having circuit completing terminal elements spaced to correspond to the spacing of said mounting elements when positioned according to said set of coordinates, said compatible circuit components being standardized and constructed for interchangeable frictional fitted mounting between selected mounting elements; heat-responsive circuit completing and holding means in contact with at least one of said compatible circuit components and at least one of said mounting elements for forming a permanent electrical contact therebetween and holding said compatible circuit components firmly in position on said base member and in good electrical contact with their respective mounting elements and means providing free space around at least one permanent contact between said mounting elements and said compatible circuit elements for eliminating undesired short circuits between circuit components mounted on said base member, whereby at least said portion of a selected electronic circuit can be assembled repetitively on successive base members by automatic machinery.

2. The combination set forth in claim 1, said mounting elements comprising upstanding metal pins projecting from said base member, at least some of said compatible circuit components being double ended and constructed to make contact with said mounting elements in two positions.

3. The combination set forth in claim 1, said heat-responsive circuit completing and holding means comprising solder in sufficient quantity to join selected mounting elements and selected circuit completing terminal elements in a clean, low resistance connection without filling said free space.

4. The combination set forth in claim 1, at least one of said circuit elements comprising a capacitor body having a slot having a metallic coating forming one plate on said capacitor body and constructed to receive a selected mounting element, said capacitor element having an outer metallic coating forming another plate on said capacitor body and a second slot for receiving another selected mounting element, the electrical circuit between said two mounting elements received by said slots being through the dielectric material comprising said capacitor body.

5. The combination set forth in claim 1, said circuit components comprising two parallel capacitors each comprising a body member of dielectric material, two metallic coatings carried by said body member, one said coating comprising an internal plate and the other metallic coating comprising an external plate for its respective capacitor, each capacitor having two spaced slot means each associated with one of said coatings and constructed to receive one of said mounting elements, said capacitors being mounted on the same mounting elements.

6. In combination a compatible components electronic system of interchangeable standardized basic electronic circuit components constructed for assembly by programmed automatic machinery into at least a portion of a selected electronic circuit being mass produced, comprising a base member, mounting elements of electrically conductive material constructed as part of said base member for electrical connection upon contact with circuit completing terminal elements of any of a group of compatible circuit components consisting of resistance, inductance, capacitance, impedance and combinations thereof; said mounting elements being positioned on said base member in accordance with a selected set of coordinates and spaced to cooperate with the circuit completing terminal elements of members of said group, compatible circuit components of a group consisting of resistance, inductance, capacitance, impedance and combinations thereof having circuit completing terminal elements spaced to correspond to the spacing of said mounting elements when positioned according to said set of coordinates, said compatible circuit components being standardized and constructed for interchangeable frictional fitted mounting between selected mounting elements, said mounting elements comprising pins projecting from said base member, heat-responsive circuit means comprising solder plating on said pins, a protective coating on said mounted circuit components and at least that part of said base member adjacent said circuit components, said base member being made of insulating material and having raised means adjacent at least some of said pins at their base and providing a portion of said base member between said last named pins free to the surrounding space and said protective coating as applied to said assembled circuit components of the combinations surrounding the assembled circuit components substantially completely.

7. The combination set forth in claim 6, said pins having ridged projections along their length and positioned to form a delta assembly system arranged in substantially hexagonal form, said circuit components being mounted between adjacent ridges on adjacent pins.

8. In combination a compatible components electronic system of interchangeable standardized basic electronic circuit components constructed for assembly by programmed automatic machinery into at least a portion of a selected electronic circuit being mass produced, comprising a base member, mounting elements of electrically conductive material constructed as part of said base member for electrical connection upon contact with circuit completing terminal elements of any of a group of compatible circuit components consisting of resistance, inductance, capacitance, impedance and combinations thereof; said mounting elements being positioned on said base member in accordance with a selected set of coordinates and spaced to cooperate with the circuit completing terminal elements of members of said group, compatible circuit components of a group consisting of resistance, inductance, capacitance, impedance and combinations thereof having circuit completing terminal elements spaced to correspond to the spacing of said mounting elements when positioned according to said set of coordinates, said compatible circuit components being standardized and constructed for interchangeable frictional fitted mounting between selected mounting elements, said circuit elements being double ended and constructed to have a friction fit between adjacent mounting elements on said base member.

9. In combination a compatible components electronic system of interchangeable standardized basic electronic circuit components constructed for assembly by programmed automatic machinery into at least a portion of a selected electronic circuit being mass produced, comprising a base member, mounting elements of electrically conductive material constructed as part of said base member for electrical connection upon contact with circuit completing terminal elements of any of a group of compatible circuit components consisting of resistance, inductance, capacitance, impedance and combinations thereof; said mounting elements being positioned on said base member in accordance with a selected set of coordinates and spaced to cooperate with the circuit completing terminal elements of members of said group, compatible circuit components of a group consisting of resistance, inductance, capacitance, impedance and combinations thereof having circuit completing terminal elements spaced to correspond to the spacing of said mounting elements when positioned according to said set of coordinates, said compatible circuit components being standardized and constructed for interchangeable frictional fitted mounting between selected mounting elements, said base member comprising resistance material providing a predetermined voltage drop between at least selected ones of said mounting elements carried thereby.

10. The combination set forth in claim 9, said compatible components electronic system comprising a sub-assembly constructed for further assembly as a whole by programmed automatic machinery to form a complete electronic product being mass produced, said sub-assembly having at least one terminal element for the sub-assembly as a whole positioned to complete the combination of said sub-assembly with another assembly to form said product when said sub-assembly and said other assembly are combined.

11. The combination set forth in claim 9, the resistance material of said base member having at least in part a reduced selected impedance value such that it provides an active voltage drop equivalent to that of at least one of said compatible circuit components between at least selected ones of said mounting elements carried thereby whereby said selected ones of said mounting elements may be connected to provide a desired impedance component in said compatible components electronic system.

12. The combination set forth in claim 8, said compatible components electronic system comprising a sub-assembly constructed for further assembly as a whole by programmed automatic machinery to form a complete electronic product being mass produced, said sub-assembly having at least one terminal element for the sub-assembly as a whole to complete the combination of said sub-assembly with another assembly to form said product when said sub-assembly and said other assembly are combined.

References Cited in the file of this patent

UNITED STATES PATENTS

| | | |
|---|---|---|
| 1,560,882 | Van Horne | Nov. 10, 1925 |
| 2,028,717 | Hayden | Jan. 21, 1936 |
| 2,066,876 | Carpenter | Jan. 5, 1937 |
| 2,176,212 | Dijksterhuis | Oct. 17, 1939 |
| 2,268,619 | Reid | Jan. 6, 1942 |
| 2,477,653 | Roane | Aug. 7, 1949 |
| 2,568,535 | Ballard | Sept. 18, 1951 |
| 2,579,141 | Eckert | Dec. 18, 1951 |
| 2,593,479 | Nieter | Apr. 22, 1952 |
| 2,647,990 | Peterson | Aug. 4, 1953 |
| 2,752,537 | Wolfe | June 26, 1956 |
| 2,759,098 | White | Aug. 14, 1956 |
| 2,816,252 | Sanders | Dec. 10, 1957 |
| 2,885,602 | Emerson | May 5, 1959 |
| 2,912,625 | Benson | Nov. 10, 1959 |

FOREIGN PATENTS

| | | |
|---|---|---|
| 154,474 | Austria | Oct. 10, 1938 |